UNITED STATES PATENT OFFICE.

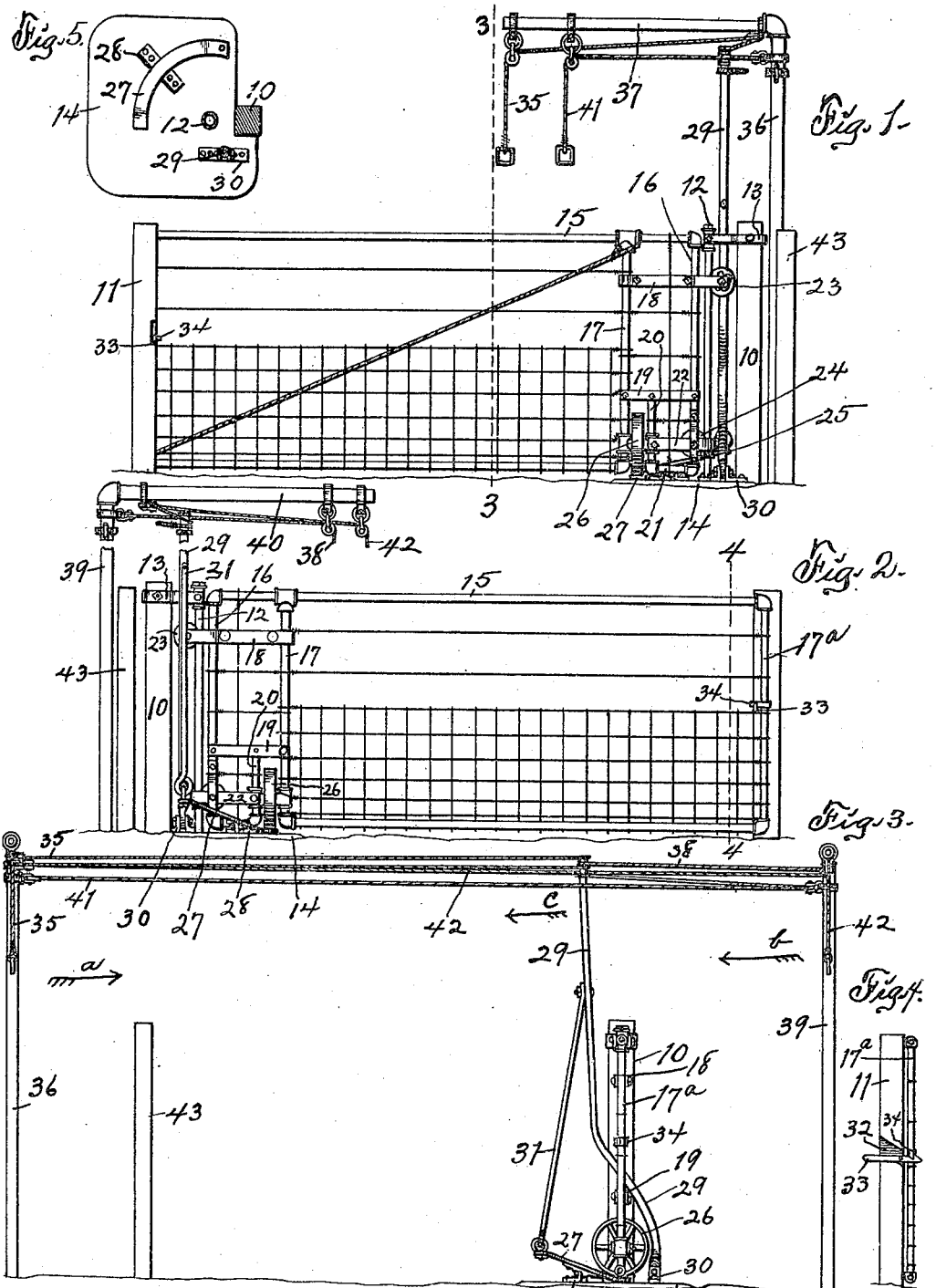

THOMAS S. HEGGEN AND SEWARD T. HEGGEN, OF HARDY, IOWA.

FARM-GATE.

987,574.  Specification of Letters Patent.  Patented Mar. 21, 1911.

Application filed August 19, 1910. Serial No. 578,460.

*To all whom it may concern:*

Be it known that we, THOMAS S. HEGGEN and SEWARD T. HEGGEN, citizens of the United States of America, and residents of Hardy, Humboldt county, Iowa, have invented a new and useful Farm-Gate, of which the following is a specification.

The object of this invention is to provide an improved construction for farm gates.

A further object of this invention is to provide improved means for raising and lowering a farm gate.

A further object of this invention is to provide improved means for latching a farm gate.

A further object of this invention is to provide improved means for opening and closing a farm gate.

Our invention consists in the construction, arrangement and combination of elements hereinafter set forth, pointed out in our claims and illustrated by the accompanying drawing, in which—

Figure 1 is an elevation from one side of our improved gate, one of the operating posts being omitted. Fig. 2 is an elevation from the opposite side of the gate, a different one of the operating posts being omitted. Fig. 3 is an elevation at right angles to Fig. 1, partly in section, on the indicated line 3—3 of Fig. 1. Fig. 4 is an elevation, partly in section, on the indicated line 4—4 of Fig. 2. Fig. 5 is a plan of part of the operating mechanism.

In the construction and mounting of the gate as shown a main post 10 and a latch post 11 are employed and conjunctively determine the gateway. A hinge rod or pintle 12 is mounted parallel with the post 10 and is secured at its upper end to said post by arms 13. The lower end portion of the hinge rod or pintle 12 preferably is secured in a concrete block 14. A gate 15 is provided with an extension at one end, which extension comprises an end bar 16 parallel with and secured at its upper end to an end bar 17 of the gate and certain other connections as follows: A yoke 18 is arranged horizontally and embraces and is clamped to the end bars 16, 17 near the top bar of the gate. A strut 19 is arranged horizontally and extends across and is clamped to the end bars 16, 17 of the gate below the horizontal center thereof. A stem 20 is fixed at its upper end to the central portion of the strut 19 and has its lower end connected by a short bar 21 to the lower end of the end bar 16. A yoke 22 is arranged horizontally, extends across and is clamped to the stem 20 and lower portion of the end bar 16. The open end portion of the yoke 18 extends across the hinge rod or pintle 12 and carries a grooved wheel 23 in engagement with said pintle and between it and the post 10. The closed end portion of the yoke 22 extends around the hinge rod or pintle 12 and carries a grooved wheel 24 in engagement with said pintle and on the opposite side thereof from the post 10. A collar 25 is mounted on and adjustable longitudinally of the pintle 12 beneath the closed end portion of the yoke 22 and said collar is adapted to be secured to said pintle by a set screw. It is the function of the collar 25 to fix and determine the altitude of the gate by supporting the yoke 22 relative to the pintle at any desired point in its range of adjustment. A wheel 26 is mounted for rotation on a horizontal axis between and supports the stem 20 and lower portion of the end bar 17 of the gate. The gate may be provided with any desired strands, stays and braces and the construction thereof forms no part of our present invention. A lever 27, of the first class, is fulcrumed on an angle plate 28 fixed to the concrete block 14. The lever 27 normally is inclined, having one end or the other thereof in contact with the concrete block and the other end directed upwardly. The lever 27 is curved on an arc having its axis coincident with that of the hinge rod or pintle and the wheel 26 is located on and adapted for travel in contact with the upper surface of said lever.

A lever 29 is mounted between the post 10 and pintle 12 and is fulcrumed at its lower end on an angle plate 30 fixed to the concrete block 14. The lever 29 is bent on a compound curve near its lower end so that the fulcrum of said lever is located on one side of the plane of the gate while the power end of said lever is located on the opposite side of said plane. A rod 31, in inclined position, pivotally connects one end portion of the lever 27 to the lever 29 at a point above the center of the latter lever. The space inclosed by the lever 26, cement block 14, lever 29 and rod 31 is irregularly triangular. A notch 32 is formed in the face of the latch post 11 toward the post 10 and a latch 33 is arranged horizontally in said notch and pivoted to said post. One end portion of the latch 32 projects through the free end portion of the gate, is beveled at its extremity and is formed with a notch between its beveled end and the latch post, which notch is adapted to receive and engage a lug 34 carried by the outer end bar 17ᵃ of the gate. The opposite arm of the latch 33 is of greater length and weight than the notched arm and tends by gravitation to hold the latch in normal horizontal position. A draft wire or cord 35 is rove through pulleys carried by an operating post 36 and an arm 37 thereon and leads to and has an attachment with the upper end portion of the lever 29. The draft wire or cord 35 is employed to open the gate when the same is approached in the direction of the arrow $a$ in Fig. 3. A draft wire or cord 38 is rove through pulleys carried by an operating post 39 and arm 40 thereon and also through a pulley carried by the operating post 36 and leads to and has attachment with the upper end portion of the lever 29. The draft wire or cord 38 is employed to open the gate when the same is approached in the direction of the arrow $b$ in Fig. 3. A draft wire or cord 41 is rove through pulleys carried by the post 36 and arm 37 and also through a pulley carried by the post 39 and is attached to the upper end portion of the lever 29. The draft wire or cord 41 is employed to close the gate when departed from in the direction of the arrow $b$ in Fig. 3. A draft wire or cord 42 is rove through pulleys carried by the post 29 and arm 40 and is attached to the upper end of the lever 29. The draft wire or cord 42 is employed to close the gate when it is departed from in the direction of the arrow $a$ in Fig. 3.

The operation of our improved gate, when the parts are adjusted as shown in the drawing, is as follows: When a pedestrian desires to open the gate he oscillates the latch 33 to release the lug 34 and swings the gate laterally in one direction only away from the latch post 11. When a rider desires to open the gate he applies draft to the wire 35 or 38 (according to the direction in which he faces the gate) and by so doing moves the lever 29 in the direction of the arrow $c$ in Fig. 3. Such movement of the lever 29 applies a thrust through the rod 31 to the lever 27 sufficient to raise the wheel 26 and the entire gate. Such raising of the gate lifts the lug 34 away from the latch 33. Such movement of the lever 27 changes the inclination thereof and causes the wheel 26 to travel through an arc along said lever and permits the gate to assume an open position in contact with a stop post 43. In its travel the wheel 26 crosses the fulcrum of the lever 27 and thereafter retains the gate against accidental reverse movement. The rider passes through the gate and to close the same applies draft to the wire or cord 42 or 41 (according to the direction in which he is departing from the gate) and by such draft moves the lever 29 in a direction opposite to that indicated by the arrow $c$ in Fig. 3. Such movement of the lever 29 applies draft through the rod 31 to the lever 27 and oscillates said lever 27 into its original position, changing the inclination thereof so that the wheel 26 will travel reversely and carry the gate to closed position. When it assumes closed position the gate contacts with the latch post 11 and the lug 34 engages and oscillates the latch 33 so that said lug may enter the notch of said latch and be retained in proximity to the latch post. When it is desired the gate may be elevated from the ground surface by adjusting the collar 25 to greater altitude on the pintle 12 to permit swine, poultry or sheep to pass beneath the gate from one field to another. The same adjustment may be made to carry the gate over accumulations of snow or ice. It is to be understood, however, that altitudinal adjustment of the gate will suspend overhead manipulation thereof because of a disconnection of the wheel 26 from the lever 27 and thereafter the gate may be opened and closed only by manual power applied directly thereto. The same adjustment also suspends the operation of the latch 33 and the gate may be retained in closed position by some means supplementary to the latch, such as by tying the gate to the latch post.

We claim as our invention—

1. In a farm gate, a hinge rod or pintle, a gate, yokes on the gate embracing said pintle, grooved wheels in the yokes engaging on opposite sides respectively of the pintle, said yokes having a freedom of movement vertically of the pintle, an arc-shaped track lever fulcrumed at its center and having its axis coincident with that of the pintle, a track wheel on the gate adapted to ride on and across the fulcrum of said track lever, an operating lever mounted for oscillation, and a rod connecting said operating lever and one end of the track lever.

2. In a farm gate, a hinge post or pintle, a gate, yokes on the gate embracing said pintle, grooved wheels in the yokes engaging on opposite sides respectively of the pintle, said yokes having a freedom of movement vertically of the pintle, an arc-shaped track lever fulcrumed at its center and having its axis coincident with that of the pintle, said gate formed with a clearance notch in its lower side, a track wheel pivoted on the gate in said clearance notch and adapted to ride on and across the fulcrum of said track lever, an operating lever mounted for oscillation and a rod connecting said operating lever and one end of the track lever.

3. In a farm gate, a main post, a latch post, a pintle parallel with and secured to the main post, a gate, yokes on the gate embracing the pintle, grooved wheels in the yokes engaging respectively opposite sides of the pintle, a track lever fulcrumed at its center, a track wheel in the gate adapted to travel on and across the fulcrum of said track lever, a bent operating lever crossing between the pintle and main post and fulcrumed at its lower end on one side of the plane of the gate, and a rod wholly located on the opposite side of the plane of the gate and connecting said bent operating lever to the outermost extremity of the track lever.

4. In a farm gate, a main post, a latch post, a pintle parallel with and secured to the main post, a gate formed with a clearance notch in its lower side, yokes on the gate embracing the pintle, grooved wheels in the yokes engaging respectively opposite sides of the pintle, a track lever fulcrumed at its center, a track wheel in the clearance notch of and pivoted to the gate and adapted to travel on and across the fulcrum of said track lever, a bent operating lever crossing between the pintle and main post and fulcrumed at its lower end on one side of the plane of the gate, a rod wholly located on the opposite side of the plane of the gate and connecting said bent operating lever to the outermost extremity of the track lever, a latch on the latch post, and a lug on the gate adapted to engage said latch.

5. In a farm gate, a main post, a latch post, a pintle parallel with and secured to the main post, a gate formed with a clearance notch in its lower side, yokes on the gate embracing the pintle, grooved wheels in the yokes engaging respectively opposite sides of the pintle, a track lever fulcrumed at its center, a track wheel in said clearance notch of and pivoted to the gate and adapted to travel on and across the fulcrum of said track lever, a bent operating lever crossing between the pintle and main post and fulcrumed at its lower end on one side of the plane of the gate, a rod wholly located on the opposite side of the plane of the gate and connecting said bent operating lever to the outermost extremity of the track lever, and overhead draft devices suitably supported and connected to said operating lever, said draft devices adapted for selective manipulation.

6. In a farm gate, a main post, a latch post, a pintle parallel with and secured to the main post, a gate formed with a clearance notch in its lower side adjacent to said latch post, yokes on the gate embracing the pintle, grooved wheels in the yokes engaging respectively opposite sides of the pintle, a track lever fulcrumed at its center, a track wheel in clearance notch of and pivoted to the gate and adapted to travel on and across the fulcrum of said track lever, a bent operating lever crossing between the pintle and main post and fulcrumed at its lower end on one side and independently of the gate, and a rod wholly located on the opposite side of the plane of the gate and connecting said bent operating lever to the outermost extremity of the track lever, together with a stop post located at one side of the driveway through the gate and spaced from the main post.

7. In a farm gate, a main post, a latch post, a pintle parallel with and secured to the main post, a gate, yokes on the gate embracing the pintle, grooved wheels in the yokes engaging respectively opposite sides of the pintle, a track lever fulcrumed at its center, a track wheel in the gate adapted to travel on and across the fulcrum of said track lever, a bent operating lever crossing between the pintle and main post and fulcrumed at its lower end on one side of the plane of the gate, a rod wholly located on the opposite side of the plane of the gate and connecting said bent operating lever to the outermost extremity of the track lever, and overhead draft devices suitably supported and connected to said operating lever, said draft devices adapted for selective manipulation, together with a stop post located at one side of the driveway through the gate and spaced from the main post.

Signed by us at Hardy, Iowa, this 25th day of May, 1910.

THOMAS S. HEGGEN.
SEWARD T. HEGGEN.

Witnesses:
Joy E. Anderson,
L. O. Larson.

---

Copies of this patent may be obtained for five cents each, by addressing the "Commissioner of Patents, Washington, D. C."